US007868847B2

(12) United States Patent
Miles

(10) Patent No.: US 7,868,847 B2
(45) Date of Patent: Jan. 11, 2011

(54) IMMERSIVE ENVIRONMENTS WITH MULTIPLE POINTS OF VIEW

(76) Inventor: Mark W Miles, Bldg. 43, Fort Mason, San Francisco, CA (US) 94123

(*) Notice: Subject to any disclaimer, the term of this patent is extended or adjusted under 35 U.S.C. 154(b) by 1600 days.

(21) Appl. No.: 11/136,111

(22) Filed: May 24, 2005

(65) Prior Publication Data
US 2006/0268013 A1 Nov. 30, 2006

(51) Int. Cl.
*G09G 5/00* (2006.01)
(52) U.S. Cl. .......................... 345/1.1; 345/1.3; 345/2.1
(58) Field of Classification Search .......... 345/1.1–3.2, 345/7–8, 9; 348/14, 52, 148
See application file for complete search history.

(56) References Cited

U.S. PATENT DOCUMENTS

| | | | | |
|---|---|---|---|---|
| 6,222,675 B1 * | 4/2001 | Mall et al. | | 359/630 |
| 6,466,183 B1 * | 10/2002 | Yamamoto et al. | | 345/1.1 |
| 6,628,297 B1 * | 9/2003 | Wraae et al. | | 345/628 |
| 6,804,406 B1 * | 10/2004 | Chen | | 382/254 |
| 6,814,578 B2 * | 11/2004 | Vorst | | 434/38 |
| 7,088,310 B2 * | 8/2006 | Sanford | | 345/7 |
| 7,180,476 B1 * | 2/2007 | Guell et al. | | 345/7 |
| 7,196,677 B2 * | 3/2007 | Sato et al. | | 345/1.3 |
| 7,321,342 B2 * | 1/2008 | Nagae | | 345/2.1 |
| 7,348,979 B2 * | 3/2008 | Tso | | 345/440 |
| 7,391,439 B2 * | 6/2008 | Buchner et al. | | 348/211.12 |
| 2002/0063726 A1 * | 5/2002 | Jouppi | | 345/660 |
| 2003/0020671 A1 * | 1/2003 | Santoro et al. | | 345/1.3 |
| 2003/0151562 A1 * | 8/2003 | Kulas | | 345/1.1 |
| 2004/0252074 A1 * | 12/2004 | Schaper | | 345/1.1 |
| 2005/0078053 A1 * | 4/2005 | Kondo et al. | | 345/8 |
| 2005/0259084 A1 * | 11/2005 | Popovich et al. | | 345/173 |
| 2006/0028394 A1 * | 2/2006 | Love et al. | | 345/1.1 |
| 2006/0152680 A1 * | 7/2006 | Shibano | | 353/30 |

\* cited by examiner

*Primary Examiner*—Nitin Patel
(74) *Attorney, Agent, or Firm*—Hahn & Moodley LLP; Vani Moodley, Esq.

(57) ABSTRACT

In one embodiment, a method is provided. The method comprises positioning a plurality of display screens at different positions within a real space, each display screen being associated with a different window into an object space through which a scene comprising objects from the object space can be seen; and displaying scenes from the object space on each of the plurality of display screens, wherein the scene displayed on each screen comprises objects from the object space that can be seen through the window associated with that screen by a hypothetical viewer positioned at a first position relative to the window and for which window the field of view is restricted to be non-overlapping with the field of view for an adjacent window.

24 Claims, 8 Drawing Sheets

FIG. 2
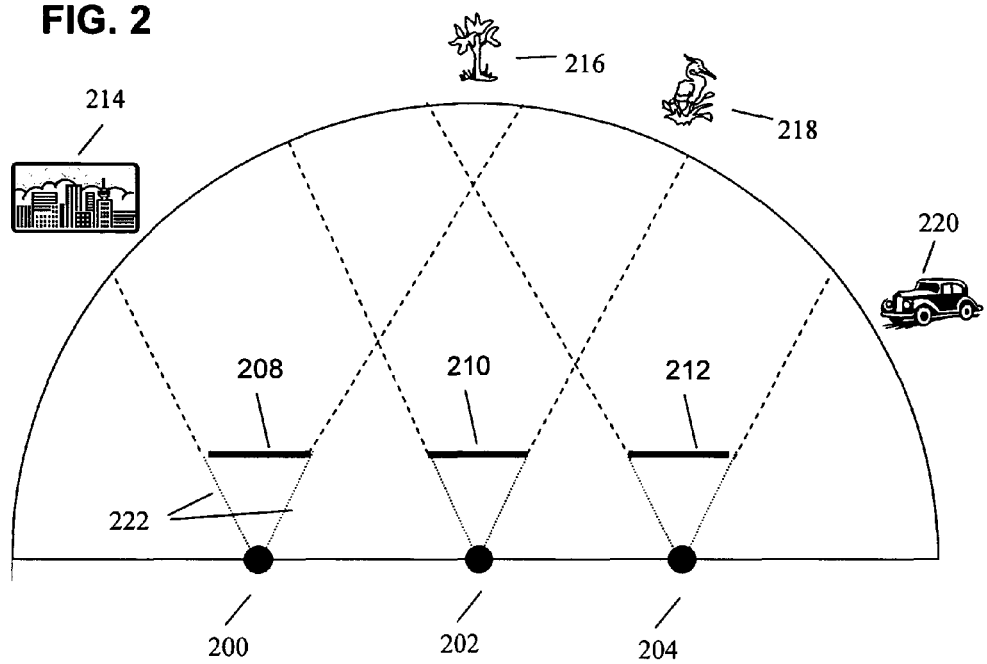
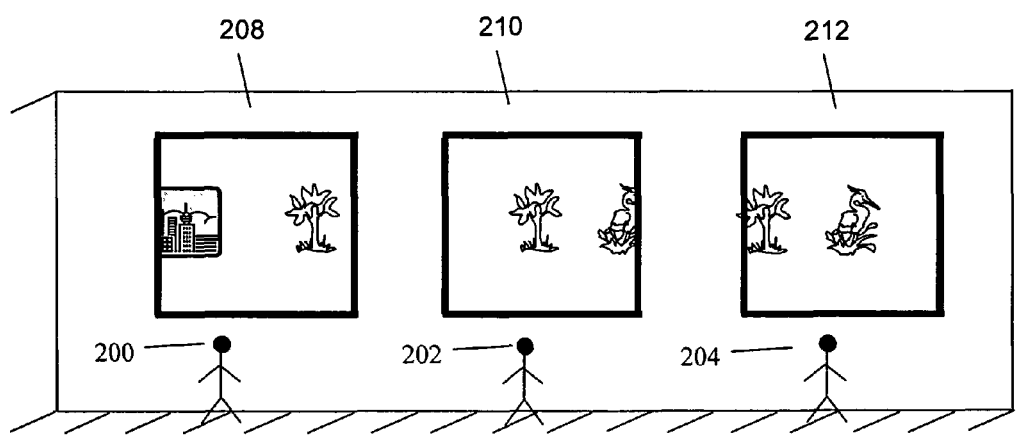

FIG. 3
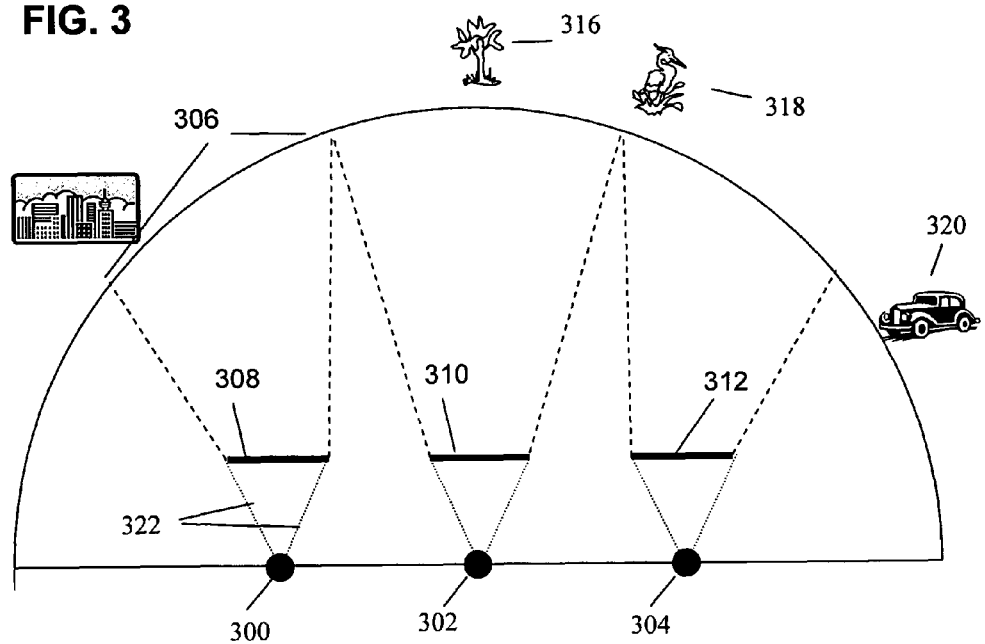
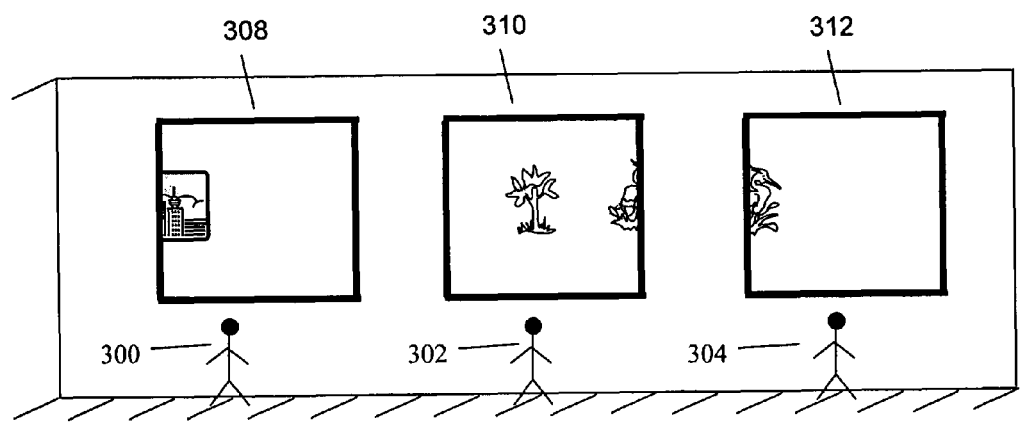

IMMERSIVE ENVIRONMENTS WITH MULTIPLE POINTS OF VIEW

FIELD OF THE INVENTION

Embodiments of this invention relate to immersive environments.

BACKGROUND

Generating and portraying immersive environments is driven by a desire to incorporate as much richness, detail, depth, and subtlety as possible in order to give an individual experiencing the environment the sensation of being totally immersed in the environment.

Methods of generating and portraying immersive environments generally fall into two categories. In the first category, the immersive environment is experienced in an isolated or individual basis, and in the second category, the immersive environment is experienced in a collaborative fashion or as part of an audience.

For immersive environments in the first category, the mechanism for experiencing the environment disconnects, with varying degrees of effectiveness, the individual from the real environment or real space. This might occur because of the use of goggles and possibly headphones or other transducers of the immersive environment. The goggles (often referred to as head mounted displays, or virtual reality goggles) provide a stereoscopic vision of the immersive environment directly to the viewer. The presence and use of these transducers prevents the individual from sensing the actual or real environment. The transducers are coupled to manipulating equipment such as a joystick or a data glove that allows the individual to directly manipulate and/or maneuver through the environment. In some cases, the transducers convey information to the individual from the environment. It is possible that the transducers also convey information from the individual to a system responsible for generating the environment.

Further, for immersive environments in the first category, an individual's perspective of the environment, with respect to a particular point, is determined by the individual under his or her direction. However, the experience of the immersive environment is isolating in that any benefit which might accrue from the presence of other individuals in the real environment is lost as a result of the use of transducers and manipulating equipment.

The second category of immersive environments allows for interaction between individuals in the real environment while they simultaneously experience the immersive environment. Examples of such environments range from planetariums and IMAX theaters to virtual reality environments and immersive theaters. For immersive environments in the second category, imagery of the immersive environment is projected or displayed onto large viewing screens which are designed to encompass a significant fraction of the audience's field of view and to envelope or surround the viewers in an immersive fashion. Such an environment does not easily provide a means for generating stereoscopic imagery, but the benefits of interaction between different individuals experiencing the same immersive environment can be realized.

For immersive environments in the second category, the perspective on the immersive environment is dictated either in a predetermined fashion, as it may change during the course of a movie playing or presentation unfolding, or under the direction of a single source of control, if the immersive environment is being synthesized in real time. Moreover, all of the individuals within the audience see the same perspective, even though the individuals are located at different spatial locations within the real environment. In the case of the planetarium example, this is acceptable. This is because the stellar objects shown in a planetarium are located so far away that changes in the spatial location of a viewer within the confines of the planetarium would have no perceptible change in the perspective of the viewer. In other words, because the stellar objects are so far away, the view of the stellar objects for any viewer within the confines of the planetarium is the same and is not dependent on the viewer's spatial location within the planetarium.

However, there are many immersive environments which simulate the real world or an object space, for which a viewer's spatial location relative to objects of the real world/object space would determine what the viewer actually sees. For example if the size of the immersive environment is comparable to that of the real space then the perspective of a viewer would be dependent on the spatial location of the viewer. Thus, for example, an individual sitting in a theater the size of a porch, looking at a synthesized view of a garden, would expect his perspective of the garden to change if he moved from one side of the theater (porch) to the other. However, current immersive environments present objects of an object space as though all viewers are located at a particular spatial location, and do not allow for perspective changes in what is seen based on the spatial location of a viewer.

SUMMARY OF THE INVENTION

According to a first aspect of the invention there is provided a method comprising positioning a plurality of display screens at different positions within a real space, each display screen being associated with a different window into an object space through which a scene comprising objects from the object space can be seen; and displaying scenes from the object space on each of the plurality of display screens, wherein the scene displayed on each screen comprises objects from the object space that can be seen through the window associated with that screen by a hypothetical viewer positioned at a first position relative to the window and for which window the field of view is restricted to be non-overlapping with the field of view for an adjacent window.

According to a second aspect of the invention there is provided a method comprising defining an object space; defining a plurality of windows, each having an associated field of view representing an angular distance for which objects in the object space are viewable by a hypothetical viewer when in a first position relative to the window, and which field of view is non-overlapping with the field of view of any other window; generating objects for the object space; and generating an image stream for each window, including a first image stream comprising the generated objects of the object space as seen through the eyes of the hypothetical viewer when in the first position.

According to a third aspect of the invention there is provided a method comprising mounting a plurality of displays within a real space; and displaying a video stream in each of the displays, wherein the video streams together define immersive content.

According to a fourth aspect of the invention there is provided a machine-readable medium comprising a plurality of video streams that together define immersive content, wherein each video stream captures an object space through the eyes of a hypothetical viewer looking into the object space through a notional window associated with the video stream, and wherein the windows associated with the video streams are spatially offset.

According to a fifth aspect of the invention there is provided a system comprising a video source which includes a plurality of video streams that together define immersive content, wherein each video stream captures an object space though the eyes of a hypothetical viewer looking at the object space through a window associated with the video stream, and wherein the windows associated with the video streams are spatially offset; and a video output mechanism to output selected ones of the plurality of video streams to a selected output channel.

According to a sixth aspect of the invention there is provided a method comprising defining a plurality of windows into an object space, each window being spatially offset relative to the other windows; generating immersive content comprising a plurality of video streams, each capturing a view of the object space from the point of view of a hypothetical viewer looking at the object space through one of the windows; and encoding the immersive content on a machine-readable medium.

Other aspects of the invention will be apparent from the detailed description below:

BRIEF DESCRIPTION OF THE DRAWINGS

FIG. 2 of the drawings shows views of an immersive environment which is viewed from the points of reference of three separate individuals wherein the views overlap;

FIG. 3 of the drawings shows views of an immersive environment from the points of reference of three separate individuals wherein the views are adjacent;

DETAILED DESCRIPTION

In the following description, for purposes of explanation, numerous specific details are set forth in order to provide a thorough understanding of the invention. It will be apparent, however, to one skilled in the art that the invention can be practiced without these specific details.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
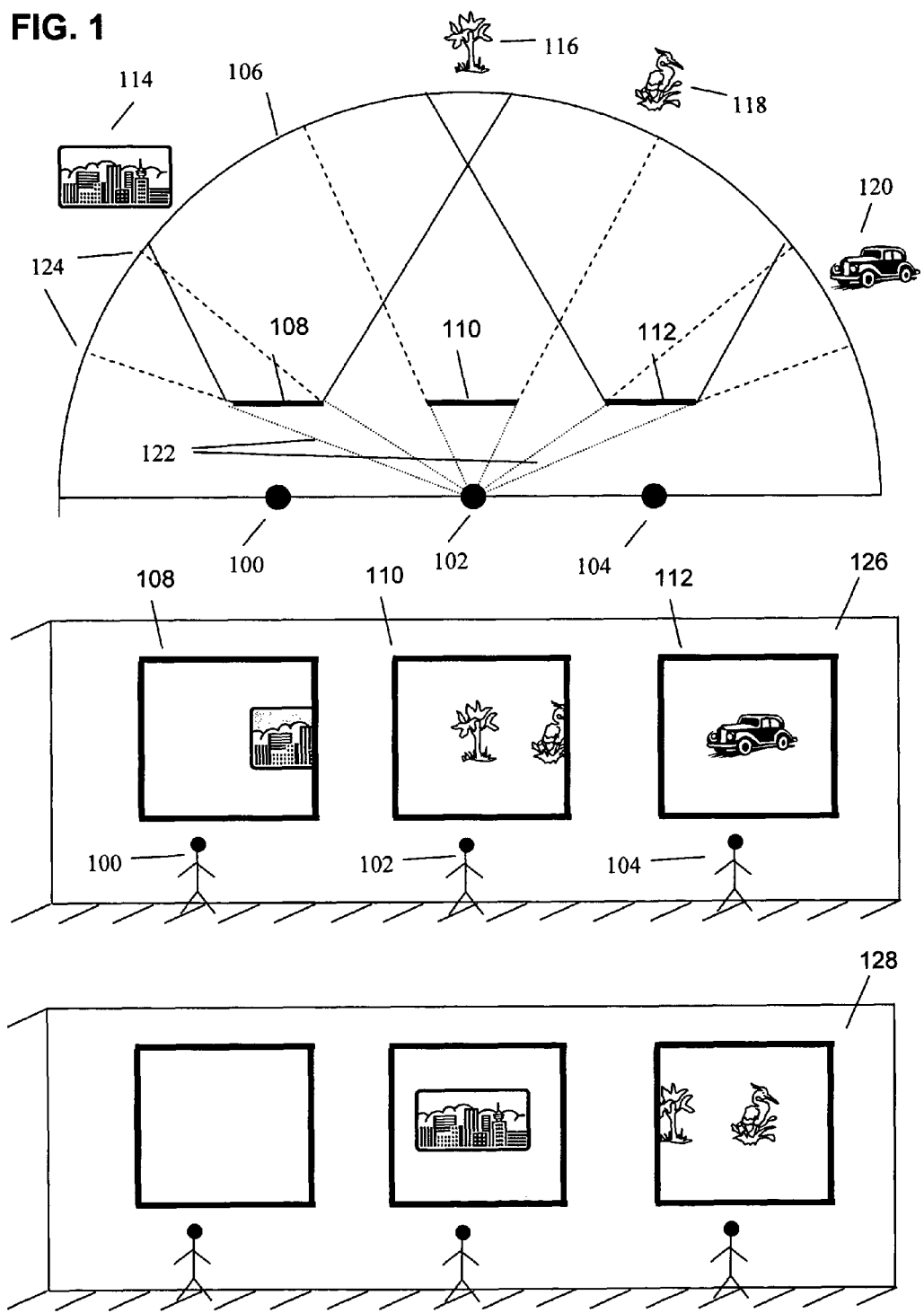
FIG. 1 of the drawings shows views of an immersive environment which is viewed from the point of reference of a single individual.

Referring now to FIG. 1, an immersive environment 106, is shown populated by a variety of objects 114, 116, 118, and 120 from an object space. An immersive environment refers to an environment which is designed to simulate an object space in a manner in which an individual in a real space experiences the object space in a way that sensory awareness of the real space is diminished and awareness of the immersive environment is enhanced so that there is the illusion that the individual in no longer in the real space, but rather in the immersive environment. One example of an immersive environment includes a computer generated space which can be seen through the use of appropriate display mediums. An immersive environment may be completely synthesized, having no imagery from the real world. For example, many recent computer generated movies do not include images captured from the real world but are, instead populated entirely by characters, settings, and objects that are generated using computer software. These worlds or environments are viewed in a theater, or on smaller viewing devices such as a television or portable movie player. The immersive environment 106 of FIG. 1 may include a representation of a real environment which has been captured using video or other image capture tools, and stored on a medium which allows for its projection or portrayal using appropriated displays. The data captured in this fashion may be subject to manipulation by computer software tools.

Display screens or displays 108, 110, and 112, which may be flat panel display or other types (projection, CRT, etc.) are shown positioned before hypothetical viewers 100, 102, and 104. The images shown on the displays are segments or portions of the immersive environment (IE) 106. In this case, the segments of the environment which are portrayed in each display, or window, are determined by the point of reference (spatial location) of the viewer 102 relative to the displays. The dotted lines 122, illustrate the segment of the IE which be seen by viewer 102 if the respective displays defined the field of view of the viewer 102. Thus, the displays are to be considered windows into the object space and each has an associated field of view defined by the angular distance between the lines 122. Dashed lines 124, for example, define the segment of the environment which is defined by the area occupied by display 108. Thus, object 114 is partially seen in window 108, object 116 resides in the center of window 110, object 118 falls partially in the window 110, and object 120 lies in the center of window 112. This is approximately how viewer 102 would see these objects if the displays acted as windows on to the IE. Vignette 126 shows the windows as they would be seen by all the viewers with the viewset (set of views on displays 108 to 112) representing the point of reference of viewer 102. Vignette 128 shows the windows as they would be seen by all the viewers with the set of views or viewset representing the point of reference of viewer 104.

This representation of the IE, which shall be referred to as a viewset, is a compromise for a number of reasons, but in particular because it does not represent the perspectives of viewers 100 and 104. Referring now to FIG. 2, a different viewset is shown. In this case, the dotted lines 222 are representative of the perspective and field of view that each of the viewer's 200, 202, and 204 would see through the windows directly in front of the, windows 208,210, and 212 respectively. Thus, viewer 200 would expect to see objects 214 and 216 at the edges of window 208, while viewer 202 would expect to see object 216 at the center of window 210. This viewset is also compromised due, in part, to the fact that each of the viewers are capable of seeing all of the windows simultaneously. The consequence is that objects which are repeated in adjacent windows, because the individual viewer's natural fields of view overlap, can be seen by all the viewers. Object 216, for example, is present in all of the windows, while object 218 is present in windows 210 and 212. This can be disconcerting and detracts from the effectiveness of the viewset at representing the SE.

In FIG. 3, a viewset is generated which attempts to compromise between the viewsets of FIGS. 1 and 2. In this case, the fields of view for each of the windows is redefined so that they do no overlap, thus object repetition is avoided. One consequence of this approach, however, is the generation of perspective discontinuity wherein the normal field of view is recast at the viewer's primary window. Viewer 300, for example, has a normal field of view which is illustrated by dotted lines 322 as defined by his primary window 308. The generated field of view which is represented by dashed lines 306, is misaligned with the normal field. This may be further disconcerting given again the fact that all viewers can observer all windows. However, such a compromise is arguably superior than the image repetition of FIG. 2.

Figure 4:
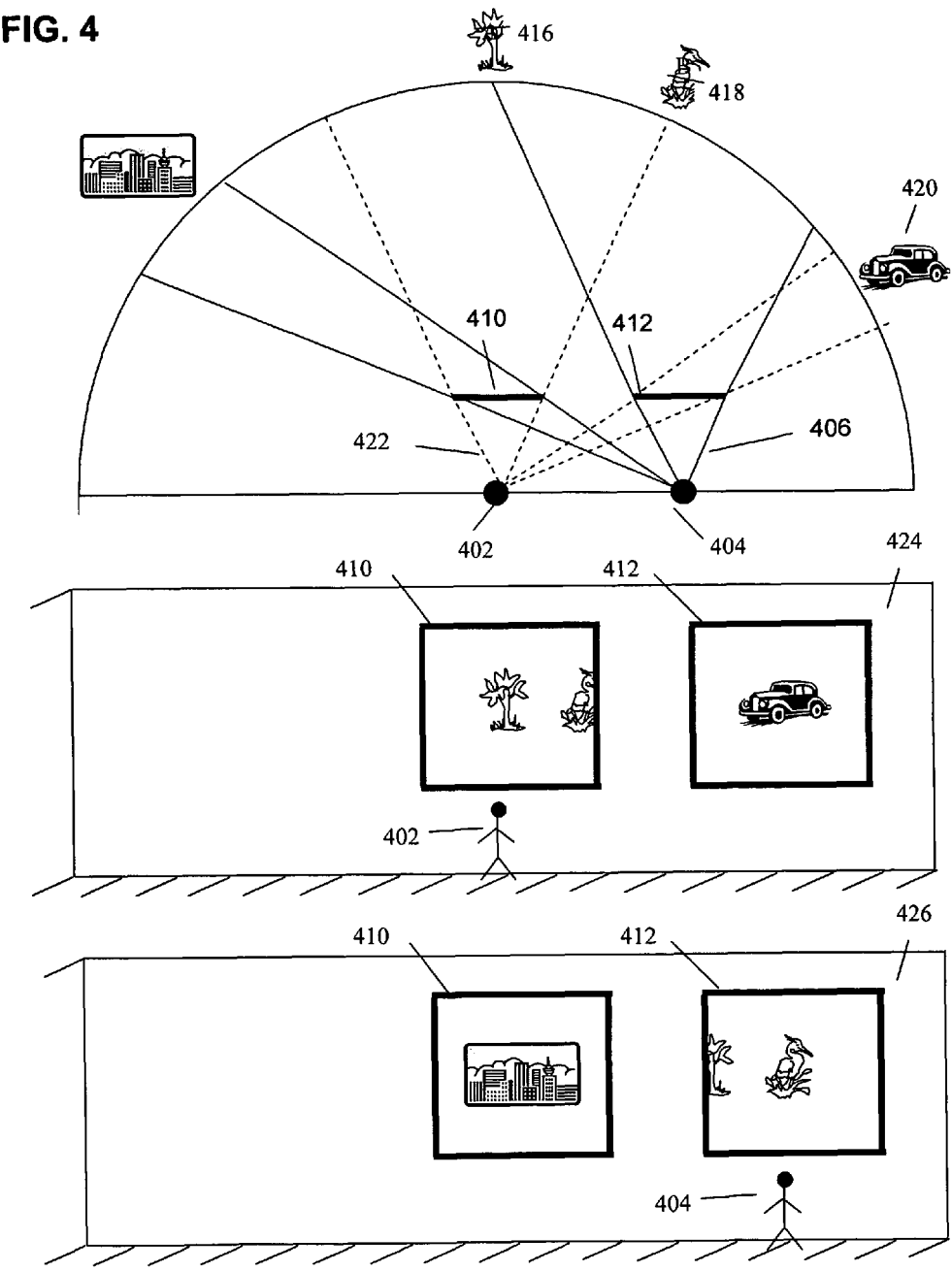
FIG. 4 of the drawings shows views of an immersive environment wherein each window is capable of portraying more than one view.

Referring now to FIG. 4, yet another viewset is shown. In this case modifications to the performance of the displays have been made to enhance the effectiveness of the viewspace even further. The number of viewers, 402 and 404, has been reduced to two in order to simplify the illustration though in all cases the assumption is that multiple viewers in arbitrary positions may participate in the viewspace.

In this embodiment, displays 410 and 412 have been modified so that they are capable of simultaneously displaying more than one scene comprising images of an object space. The scenes represent different perspectives of the object space. Whether or not the perspective can be seen depends on the viewers position with respect to the display, or in general the viewer's point of reference. Dotted lines 422 represent the two sets of perspectives which can be seen by viewer 402. Solid lines 406 are used to represent the perspectives which can be seen by viewer 404. The perspective of the IE that viewer 402 can see on display 412 is different than the perspective of the IE that viewer 404 can see in display 412. Vignette 424 illustrates the perspectives shown on the displays as seen from the point of reference of viewer 400. Vignette 426 illustrates the perspectives visible to viewer 404 in the displays. In general, for the embodiment shown in FIG. 4, it is possible that each screen displays multiple scenes, each representing a different perspective of the object space. In one embodiment, a real viewer's actual location relative to a display screen in the real space is mapped to the position of a hypothetical viewer relative to the window associated with the screen. This mapping determines which scene the real viewer actually sees. For example, from FIG. 4, it will be seen that viewer 402 sees a tree object in the display 410, whereas viewer 404 sees a city skyline in the display 410. If the viewer 404 were to move to the left, then at some point the viewer 404 would see the tree object on the display 410. Likewise, if the viewer 402 were to move to the right, then at some point the viewer 401 would see the city skyline the display 410.

In one embodiment, each scene that is shown on a display is correlated to a zone that is spatially located relative to the display. For example, in FIG. 4, the scene with the tree object in display 410 may be correlated to a first zone which is adjacent the display 410, whereas the scene with the city skyline may be correlated to a second zone which is laterally offset from the display 410. Thus, if a real viewer is in the first zone, then the viewer would see the tree object in display 410, as is the case for the hypothetical viewer 402, and if the viewer is in the second zone then the viewer would see the city skyline in display 410, as is the case for hypothetical viewer 404. It will be appreciated that as a viewer moves between zones, the scene that the viewer sees on a particular display will change to correlate with the change in the zone.

The consequence is that perspective discontinuity can be reduced or eliminated. The overall result is a viewset which is a more realistic representation of the IE than the prior three embodiments. The viewspace is still compromised in that the viewer's perspective of the IE does not change in a continous fashion as the viewer's point of reference changes. It does so in a staggered way shifting suddenly as the viewer shifts position. This can be further mitigated by increasing the number of views which can be portrayed in a given window. Ordinary displays can be easily modified to make them capable of portraying multiple views simultaneously.

Figure 5:
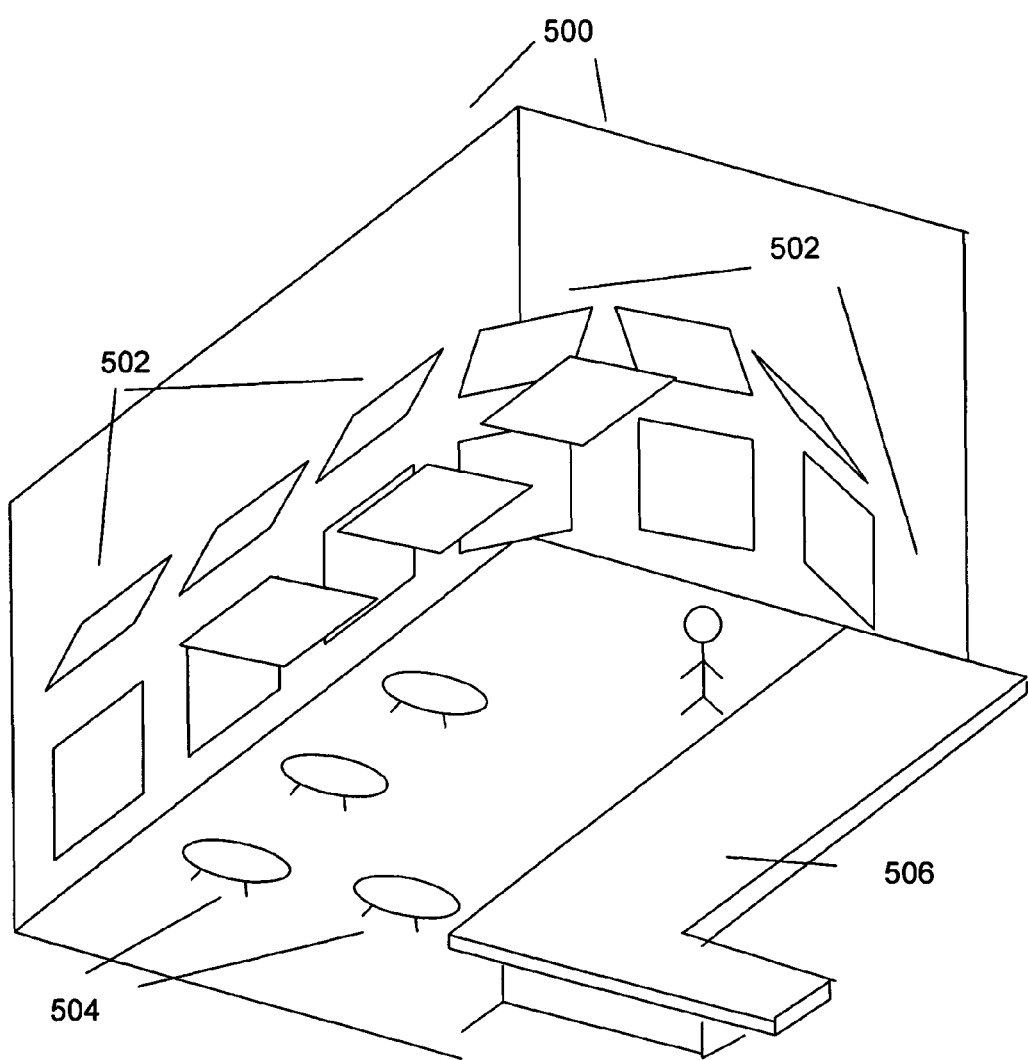
FIG. 5 of the drawings shows an example of a multichannel viewspace environment configured for entertainment.

Referrring now to FIG. 5, a viewspace 500 is illustrated. A viewspace is location in the real world which is visually augmented by the presence of multiple windows which can portray imagery or visual content, such as representations of a IE. The viewspace may be inside a building, or outside depending on the capabilities of the display devices. The configuration of the windows may be arbitrary depending on the setting and the nature of the content. Viewspace 500 is in the form of a bar or lounge where the viewspace is configured to provide a collective perspective on immersive environment. It is collective in the sense that patrons of the lounge may all experience the IE at the same time, but with the benefits of the various window and viewset configurations as described earlier. Many different kinds of spaces and places, besides bars or lounges, may be augmented in this fashion.

Figure 6:
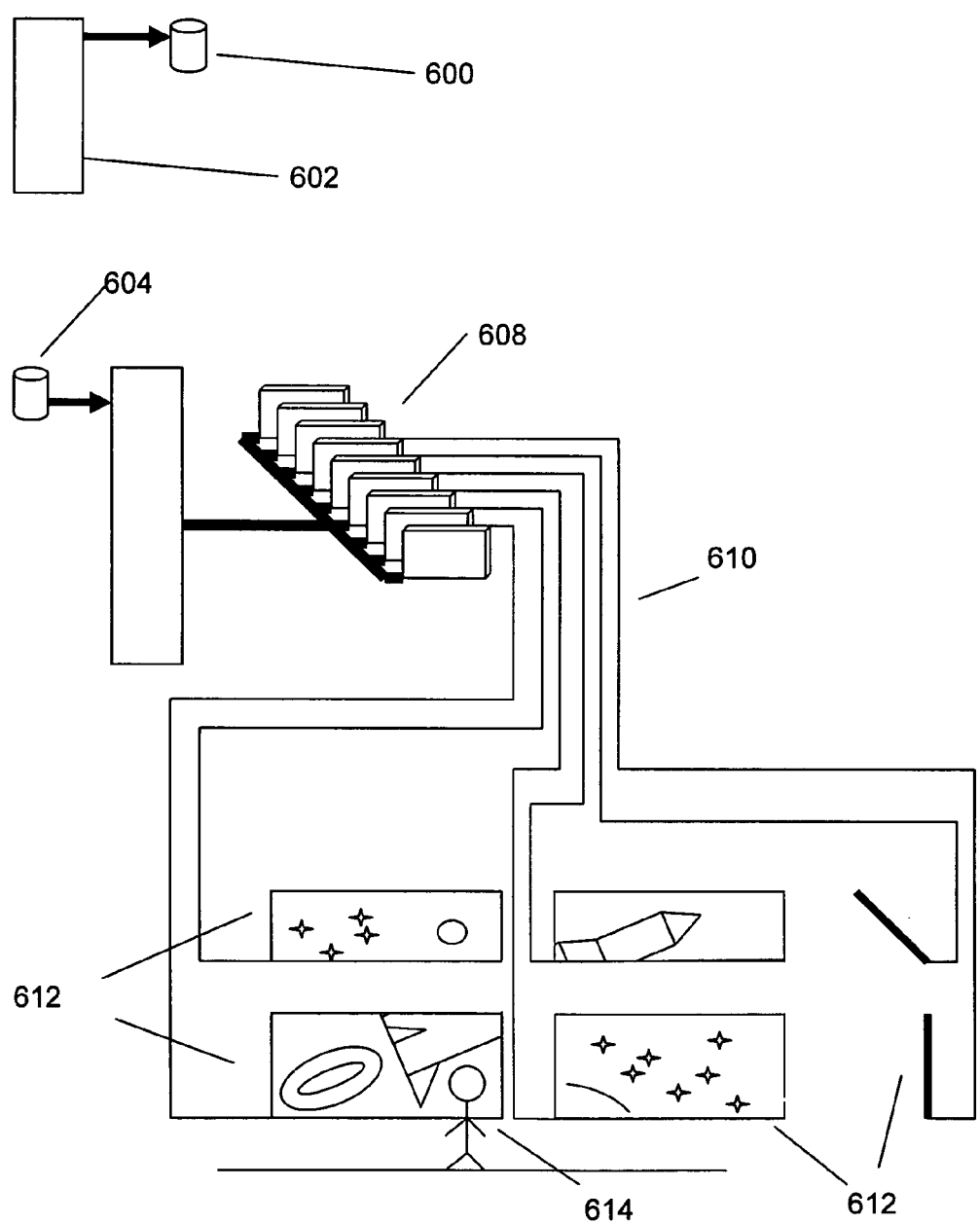
FIG. 6 of the drawings illustrates the system architecture for generating and portraying a multichannel viewspace environment.

Referring now to FIG. 6, one particular architecture is shown that can be used to generate and support a viewspace. Machine-readable medium 600, which may be in the form of an array of hard disk drives, optical disks, tapes, or other high data content medium, is used to store content which is generated by computer graphics (CG) and rendering facility 602. This content is usually developed by artists or animators who are skilled in the art of creating purely immersive imagery and/or imagery which combines the immersive with the real. For example there is a lot of immersive imagery which is incorporated into much of the visual media that is watched. In one embodiment, the machine-readable medium may include a plurality of video streams that together define immersive content, wherein each video stream captures an object space through the eyes of a hypothetical viewer looking into the object space through a notional window associated with the video stream, and wherein the windows associated with the video streams are spatially offset.

The immersive content may be transmitted or transported to playback storage medium 604, which is of a similar nature to medium 600. The medium 600 may thus be regarded as a video source. Window server 606, may be a computer of custom or off-the-shelf design which is used to route data from the medium 604, to an array of window controllers 908. The window server 606 defines a video output mechanism. The server also acts to dictate the mode and other operational details of the window controllers. Data from the controllers is transmitted to there respective windows via buss 910. The buss 910 defines multiple output channels, each to a particular window. The windows 612, reside in the viewspace where they can be experienced by viewer 614. Content can be played back in a fashion similar the playing of a movie. Alternatively, the content may be manipulated in real time according again to the purpose and function of the viewspace, and the specific nature of the content. In one embodiment, the windows server 606 outputs selected ones of the plurality of video streams from the medium 604 to a selected output channel defined by a particular bus line on the bus 910.

Figure 7:
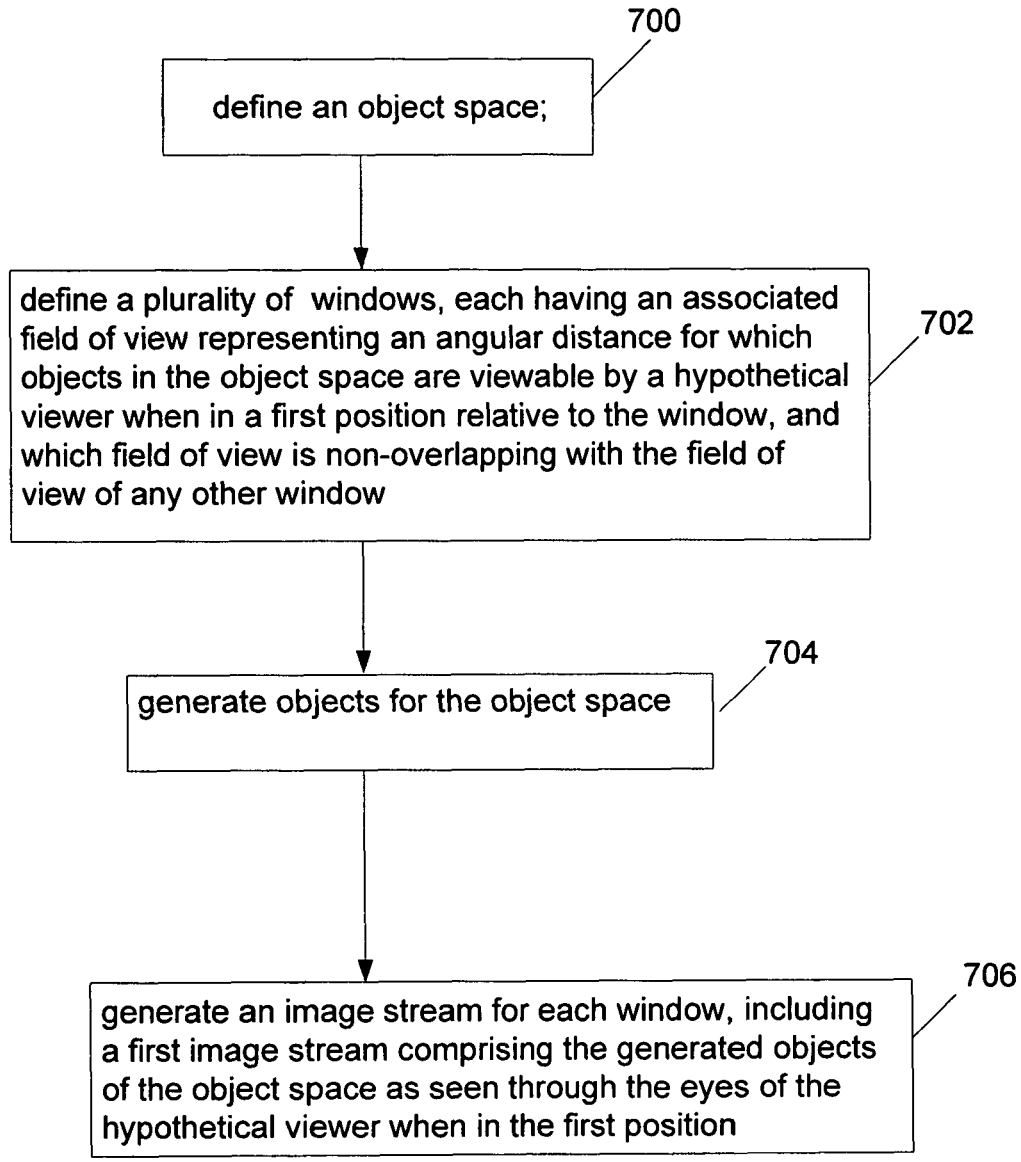
FIGS. 7 and 8 illustrate techniques for generating immersive content in accordance with embodiments of the invention.

Embodiments of the invention extend to techniques for generating immersive content. On such technique is shown in FIG. 7 of the drawings. Referring to FIG. 7, in process 700, an object space is defined. In process 702 a plurality of windows, each having an associated field of view representing an angular distance for which objects in the object space are viewable by a hypothetical viewer when in a first position relative to the window, and which field of view is non-overlapping with the field of view of any other window is defined. In process 704, objects for the object space are generated. In process 706, an image stream for each window, including a first image stream comprising the generated objects of the object space as seen through the eyes of the hypothetical viewer when in the first position is generated.

Figure 8:
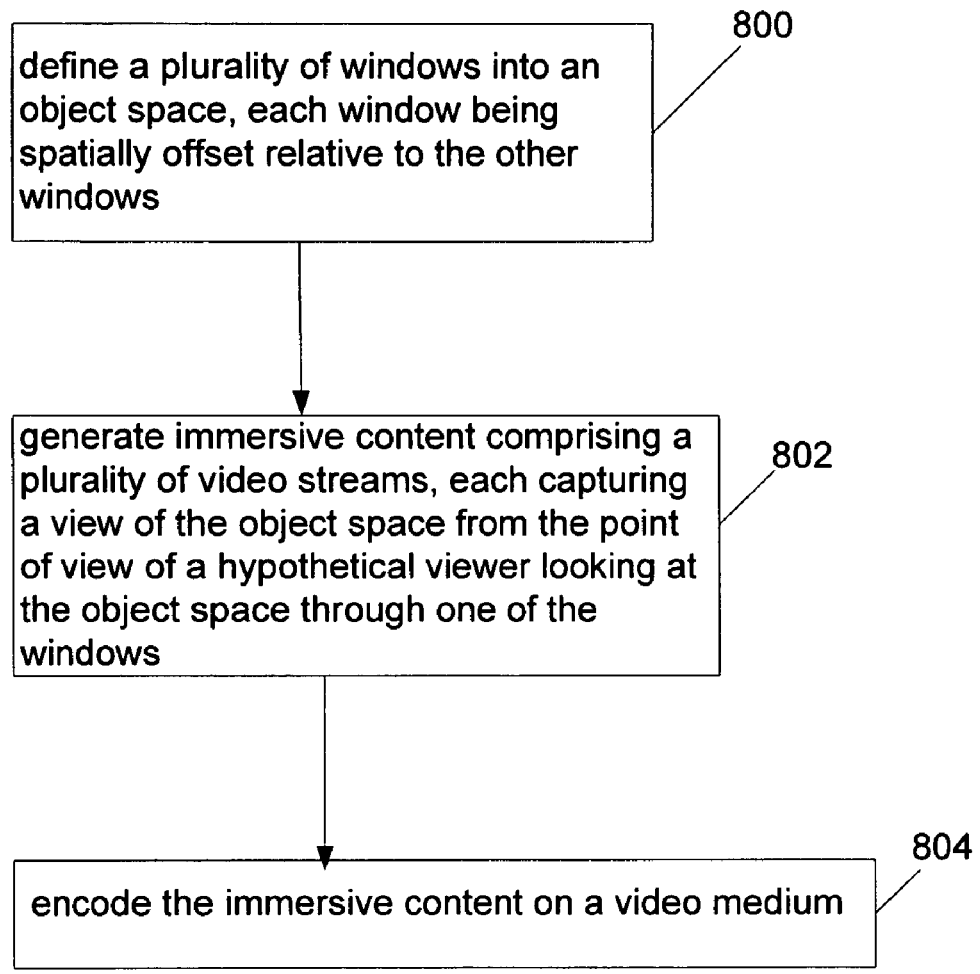

Another technique for generating immersive content is illustrated in FIG. 8 of the drawings. Referring to FIG. 8, in process 800 a plurality of windows into an object space, each window being spatially offset relative to the other windows is defined. In process 802, immersive content comprising a plurality of video streams, each capturing a view of the object space from the point of view of a hypothetical viewer looking at the object space through one of the windows is generated. In process 804, the immersive content is encoded on a machine-readable medium.

What is claimed is:

1. A method, comprising:
    positioning a plurality of display screens at different positions within a real space, each display screen being associated with a different window into an object space through which a scene comprising objects from the object space can be seen; and
    displaying scenes from the object space on each of the plurality of display screens, wherein the scene displayed on each screen comprises objects from the object space that can be seen through the window associated with that screen by a hypothetical viewer positioned at a first position relative to the window and for which window the field of view is restricted to be non-overlapping with the field of view for an adjacent window.

2. The method of claim 1, wherein the first position is in front of the window.

3. The method of claim 1, further comprising, for at least one of the display screens, in addition to displaying a first scene comprising objects of the object space that can be seen by the hypothetical viewer through the window associated with the said one of the display screens from the first position, displaying a second scene comprising objects of the object space that can be seen by the hypothetical viewer though the window associated with said one of the display screens from a second position which is different from the first position.

4. The method of claim 3, further comprising displaying multiple second scenes, each corresponding to a different second position.

5. The method of claim 4, wherein a scene that a real viewer actually sees on the said one of the display screens is based on a mapping of the real viewer's actual location relative to the said one of the display screens in the real space to the position of the hypothetical viewer relative to the window associated with the said one of the display screens.

6. The method of claim 4, further comprising correlating the first scene and each one of the second scenes to zones spatially located relative to the said one of the display screens.

7. The method of claim 6, wherein for all positions of a real viewer within a particular zone the scene correlated to that zone can be seen, the scene changing as the real viewer moves between zones.

8. The method on claim 1, wherein the object space comprises a synthesized space.

9. A method, comprising:
    defining an object space;
    defining a plurality of windows, each having an associated field of view representing an angular distance for which objects in the object space are viewable by a hypothetical viewer when in a first position relative to the window, and which field of view is non-overlapping with the field of view of any other window;
    generating objects for the object space; and
    generating an image stream for each window, including a first image stream comprising the generated objects of the object space as seen through the eyes of the hypothetical viewer when in the first position.

10. The method of claim 9, wherein the first position is in front of the window.

11. The method of claim 9, wherein generating the image stream comprises generating at least one other second image stream comprising the generated objects of the object space as seen through the eyes of the hypothetical viewer when in a second position relative to the window, the second position being different from the first position.

12. The method of claim 11, wherein each second position is laterally offset from the first position.

13. The method of claim 9, wherein the object space comprises a synthesized space.

14. A method, comprising:
    mounting a plurality of displays within a real space; and
    displaying a video stream in each of the displays, wherein the video streams together define immersive content and each video stream comprises scenes of an object space as seen by a hypothetical viewer looking into the object space through a notional window associated with the video stream, wherein the windows associated with the video streams are spatially offset.

15. The method of claim 14, wherein the video streams are pre-generated.

16. The method of claim 14, wherein at least some of the displays include a two-dimensional display surface.

17. The method of claim 14, wherein the video streams are displayed simultaneously.

18. A machine-readable medium, comprising:
    data for a plurality of video streams that together define immersive content, wherein each video stream captures an object space through the eyes of a hypothetical viewer looking into the object space through a notional window associated with the video stream, and wherein the windows associated with the video streams are spatially offset; and wherein each window has a field of view which is non-overlapping with that of any other window.

19. A system, comprising:
    a video source which includes a plurality of video streams that together define immersive content, wherein each video stream captures an object space though the eyes of a hypothetical viewer looking at the object space through a window associated with the video stream, and wherein the windows associated with the video streams are spatially offset; and wherein each window has a field of view which is non-overlapping with that of any other window; and
    a video output mechanism to output selected ones of the plurality of video streams to a selected output channel.

20. The system of claim 19, wherein each output channel defines an input to a display.

21. The system of claim 19, wherein at least some of the displays include a two-dimensional display surface.

22. The system of claim 19, further comprising the displays.

23. The system of claim 19, wherein the video output mechanism outputs the selected ones of the plurality of video streams simultaneously.

24. A method, comprising:
- defining a plurality of windows into an object space, each window being spatially offset relative to the other windows; wherein each window has a field of view which is non-overlapping with that of any other window;
- generating immersive content comprising a plurality of video streams, each capturing a view of the object space from the point of view of a hypothetical viewer looking at the object space through one of the windows; and
- encoding the immersive content on a machine-readable medium.

* * * * *